United States Patent [19]
Kuhn

[11] 3,944,245
[45] Mar. 16, 1976

[54] MOTOR VEHICLE FRAME ASSEMBLY

[76] Inventor: Billy J. Kuhn, R.R. No. 2, Box 471 H, Bridgeport, Ind. 46231

[22] Filed: Aug. 5, 1974

[21] Appl. No.: 494,746

[52] U.S. Cl........ 280/106.5 R; 280/6 R; 296/23 MC
[51] Int. Cl.² ......................................... B62D 21/00
[58] Field of Search...... 280/106.5 R, 106.5 A, 6 R, 280/109, 120, 124 A, 125, 136; 267/15 R, 20 R, 20 A; 296/23 MC

[56] References Cited
UNITED STATES PATENTS

| 2,737,398 | 3/1956 | Mohr | 267/20 A |
| 3,201,142 | 8/1965 | Dangauthier | 280/106.5 R |
| 3,272,493 | 9/1966 | Carbon | 280/120 |
| 3,510,143 | 5/1970 | Carpenter | 280/6 R |
| 3,542,387 | 11/1970 | Schmid | 280/6 R |
| 3,843,189 | 10/1974 | Duff | 296/23 MC |

*Primary Examiner*—Philip Goodman
*Assistant Examiner*—John A. Carroll
*Attorney, Agent, or Firm*—Woodard, Weikart, Emhardt & Naughton

[57] ABSTRACT

A motor vehicle frame assembly particularly adapted to support rear loading and provide antisway characteristics. The side rail of a motor vehicle main frame structure has a rear kick-up portion which extends to the rear end of the side rail, and a frame member is pivotally attached to the side rail, the frame member extending downwardly and outwardly from the kick-up portion. The rear axle of the motor vehicle is attached to the frame member near its rear end portion, providing rearward support for rear loading of the motor vehicle. A spring is interposed between the rear end portion of the frame member and the underside of the motor vehicle outwardly of the kick-up portion, providing antisway characteristics for the motor vehicle.

4 Claims, 4 Drawing Figures

MOTOR VEHICLE FRAME ASSEMBLY

BACKGROUND OF THE INVENTION

1. Field of the Invention:

The invention is in the field of land vehicles with roll responsive rocking axles for body banking.

2. Description of the Prior Art:

In the past, various vehicle stabilizer assemblies have been proposed, these being variously spring and shock absorber systems. Examples of such stabilizer assemblies may be found in U.S. Pat. Nos. 3,140,098 to Broadwell; 3,397,895 to Kuniskis; 3,423,099 to Mars; and 3,572,746 to Mueller. A hydraulic leveling device which includes a longitudinally extending control arm pivotally attached to a frame side rail is disclosed in U.S. Pat. No. 3,123,349 to Cislo.

With the advent of slide-in campers, as well as fifth wheel campers and trailers, the rear loading requirements for pickup trucks and other motor vehicles have increased. In addition to the normal expedients of modifications to the spring and shock absorber systems, antisway mechanisms, such as disclosed in the above-cited patents, have been introduced. So far as applicant is aware, however, means have not been provided for better weight distribution of the rear loading relative to the rear axle in combination with changes and improvements to the springing of the rear load of a motor vehicle.

SUMMARY OF THE INVENTION

One embodiment of the present invention is a frame assembly for a motor vehicle comprising a main frame structure, including a side rail having a rear kick-up portion which extends to the rear end of the side rail, and a frame member, pivotally attached to the side rail, extending rearwardly and positioned lower than the kick-up portion, the rear axle of the motor vehicle being attached to the frame member adjacent the rear end of the frame member.

It is an object of the present invention to provide new points of balance and weight distribution for the axles of a motor vehicle.

It is a further object of the present invention to reduce road sway, particularly in heavily rear-loaded motor vehicles.

Further objects and advantages of the present invention shall be apparent from the following detailed description and accompanying figures.

DESCRIPTION OF THE PREFERRED EMBODIMENT

Figure 1:
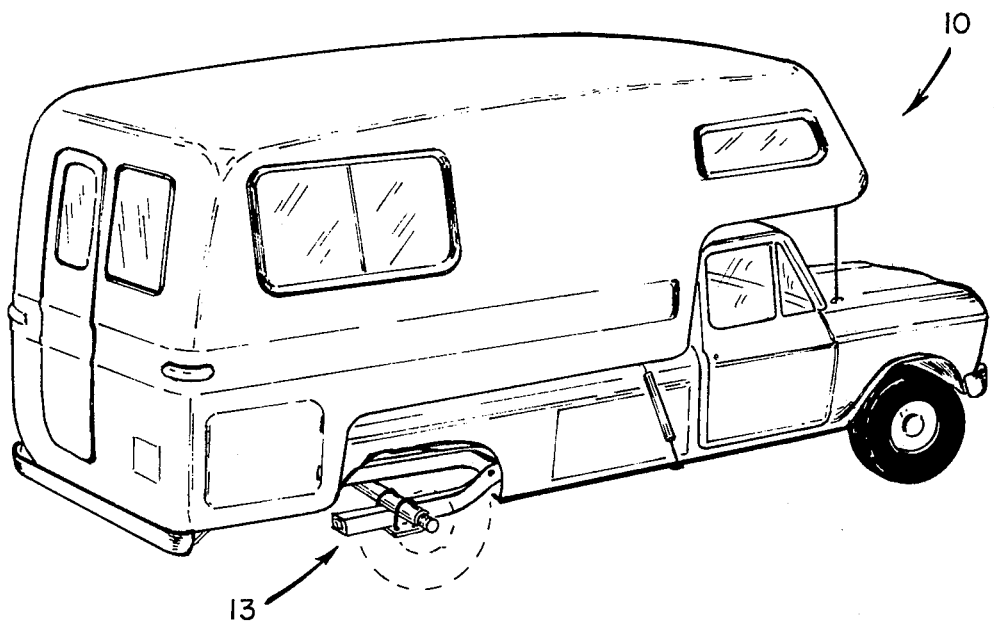
FIG. 1 is a side view of a pickup truck and camper with a portion of the rear of the truck in the area of the rear axle removed to show the frame assembly.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
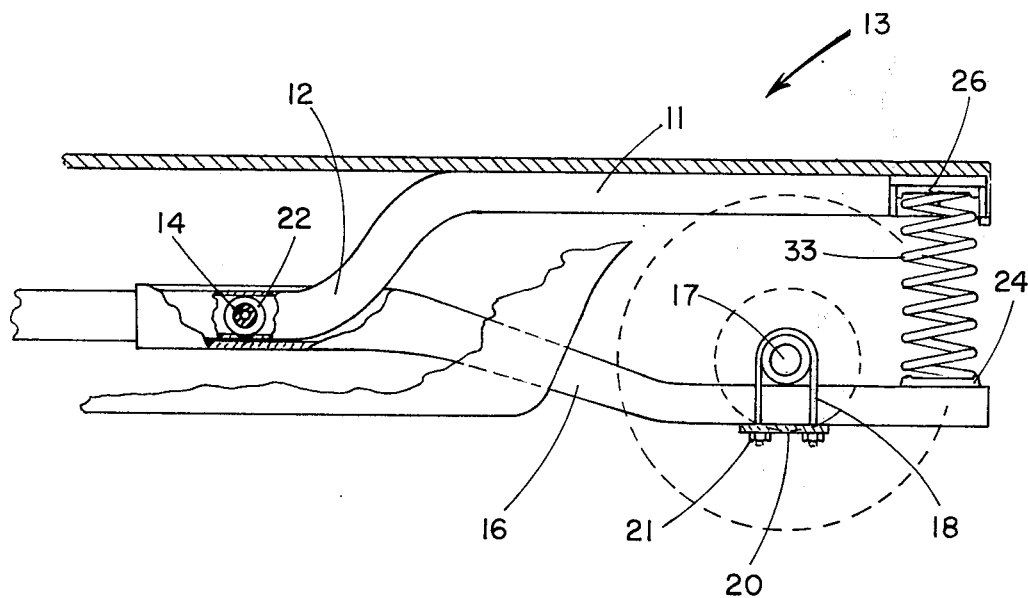
FIG. 2 is an enlarged view of the portion of the frame assembly of FIG. 1.

Referring in particular to FIGS. 1 and 2, there is shown a pickup truck 10 having a camper mounted thereon. Truck 10 has a main frame structure whose rear portion 13 includes side rail 12 with kick-up portion 11. Kick-up portion 11 extends to the rear of the motor vehicle rather than assuming the standard configuration wherein the kick-up portion returns to its lower level at the rear of the vehicle. A lower frame member 16 is pivotally attached to side rail 12 by pin 14. The vehicle rear axle and axle housing 17 is attached to frame member 16 by U-bolts 18 and 19 (FIGS. 2 and 4) and nuts such as 21. The bottoms of U-bolts 18 and 19 pass through plate 20, which bears against the bottom of frame member 16 and is held in place by nuts 21 on bolts 18 and 19.

Figure 3:
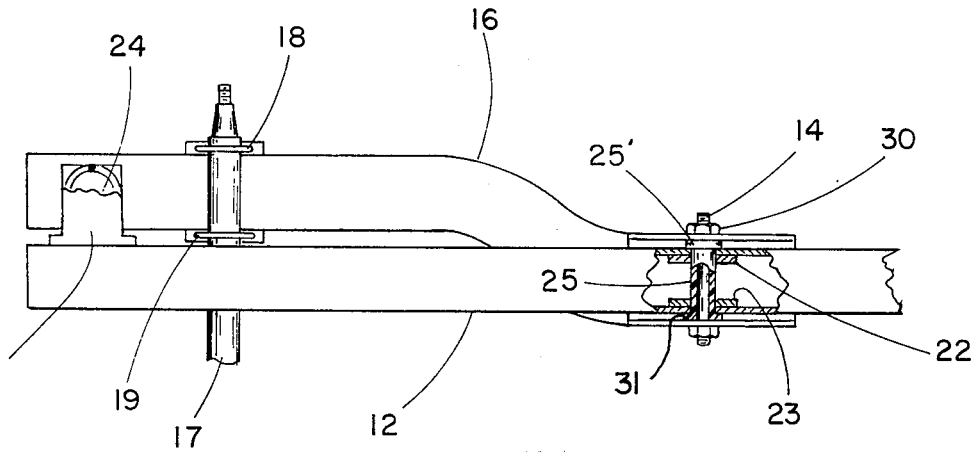
FIG. 3 is a top view of a portion of the rear axle, the kick-up portion of the side rail and the pivotally attached frame member of the frame assembly of FIGS. 1 and 2.

The pivotal attachment between side rail 12 and frame member 16 is shown most clearly in FIGS. 2 and 3. Pivot pin 14 extends through both frame member 16 and side rail 12, with pads 22 and 23 welded inside side rail 12 as shown. Pin 14 is centered within a Teflon bushing 25, welded pads 22 and 23, side rail 12, and frame member 16. As used herein, Teflon shall mean a synthetic fluorine-containing resin. Frame member 16 is shaped, in the area of pivot pin 14, so as to fit around the outside of side rail 12 on its sides and is pivotally attached on pin 14. Frame member 16, therefore, is free to pivot in an arc upward and downward, and rear axle 17, being rigidly attached to frame member 16, also travels in this arc.

Teflon bushing 25 surrounds pin 14 within side rail 12 and includes a flanged end portion 31 disposed between the outside of side rail 12 and the inside of frame member 16. Bushing 25 is positioned through side rail 12, extending through welded pads 22 and 23, and the flanged portion 31 of bushing 25 is located on the outside of side rail 12. A Teflon washer 25' is fitted over the opposite end of bushing 25 outside the opposite side of side rail 12. Frame member 16 is then positioned over side rail 12 in the vicinity of the pivotal attachment, aligning holes in frame member 16 with the center opening through bushing 25, and pin 14 is inserted through the frame member and side rail 12. Nuts 30 are then attached to pin 14 to retain pin 14 within frame member 16 and side rail 12. The surface of nuts 30 adjacent frame member 16 may include a Teflon layer or, alternatively, an additional Teflon washer may be positioned between retaining nuts 30 and frame member 16.

A frame member similar to frame member 16 on the opposite side of vehicle 10 is pivotally attached to a similar side rail and the opposite side of the frame assembly is essentially a mirror-image of the suspension and framing arrangement as shown for the side of vehicle 10 illustrated in FIG. 1. Consequently, a detailed description of the opposite side of the frame assembly shall not be provided, it being understood that the description of the details of the rear frame assembly are essentially the same for both sides of the motor vehicle.

Figure 4:
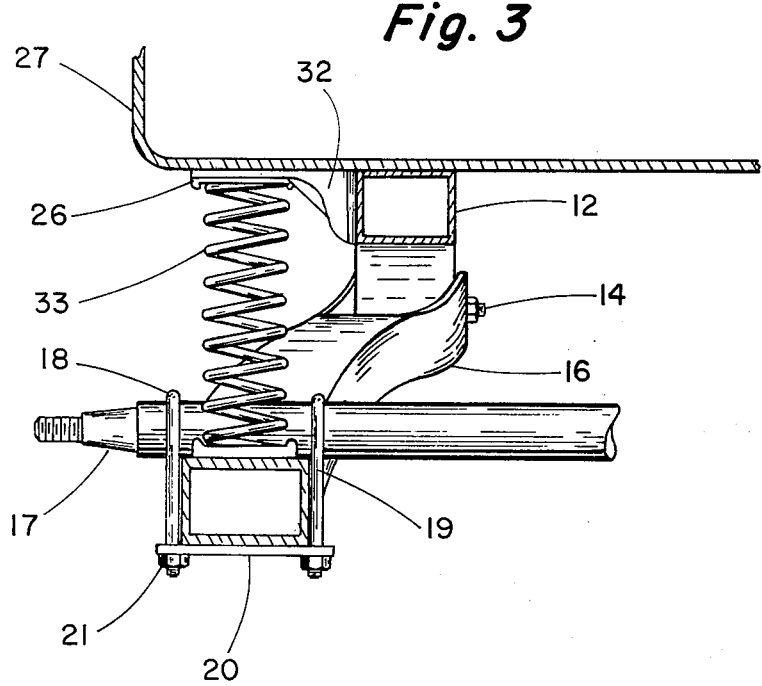
FIG. 4 is a rear view of the portion of the assembly of FIG. 3 and including the spring.

Referring now to FIGS. 2 and 4, there is also shown a spring 33 attached at its lower end to frame member 16 within spring holder 24. The top of spring 33 is received in spring holder portion 26 of spring-frame hanger 32 which is welded to frame kick-up portion 11 (FIGS. 2, 3 and 4). The spring and spring holders are located laterally outward from the position of frame side rail 12 due to the outward flare of frame member 16 as shown in FIGS. 3 and 4. A suitable shock absorber may be coupled between frame member 16 and side rail 12. The location of spring 33 outward of the main frame assists in increasing the anti-sway characteristics of the vehicle. Also, as can be seen from FIGS. 1 and 2, the rear axle 17 of the motor vehicle is placed further to the rear than on a conventional motor vehicle, this positioning being possible because the kick-up portion 13 of side rail 12 extends all the way to the rear of the vehicle.

It can be seen that a motor vehicle rear frame assembly has been provided which provides new points of balance and weight distribution for a motor vehicle.

It can also be seen that a motor vehicle rear frame assembly has been described which reduces road sway, particularly in heavily rear loaded motor vehicles.

While there have been described above the principles of this invention in connection with specific apparatus, it is to be clearly understood that this description is made only by way of example and not as a limitation in the scope of the invention.

What is claimed is:

1. A frame assembly for a motor vehicle comprising: a main frame structure having a motor vehicle body affixed thereto and including a pair of side rails having a rear kick-up portion which extends rearwardly along the side rail, the body extending rearwardly and downwardly from the kick-up portion,
a pair of frame members pivotally attached to the side rails, each frame member extending rearwardly and positioned lower than the kick-up portion of the side rail to which it is attached, the rear axle of the motor vehicle being attached to the frame members near the rear ends of the frame members; and
a pair of springs, each spring of said pair being positioned between the rear end of one of said frame members and the underside of the rear end of the body behind the rear axle, said springs transmitting the weight of the rear end of the vehicle from points behind said axle, through the rear ends of said frame members to said axle to inhibit pitching motion of said body;
said frame members extending outwardly from their point of attachment to the kick-up portion as well as downwardly and rearwardly from their point of attachment to a level below the kick-up portion of the side rails, the assembly further comprising a pair of spring holders, one of said spring holders being rigidly attached to each of said side rails at a point laterally outside of the side rail and directly under the body behind the rear axle, each of said springs having a lower end mounted to one of said frame members at the rear end thereof and an upper end received in one of said spring holders, the lower ends of said springs being horizontally spaced from each other a greater distance than the spacing between said side rails at said spring holders to inhibit lateral roll motion of said body.

2. A frame assembly for a motor vehicle comprising:
a main frame structure having a truck body affixed thereto and including a pair of side rails having a rear kick-up portion which extends to the rear end of the side rail, the truck body having a camper secured thereto and projecting rearwardly therefrom, the camper projecting downward behind said truck body and main frame structure and rearwardly therefrom,
a pair of frame members pivotally attached to the side rails, each frame member extending rearwardly and positioned lower than the kick-up portion of the side rail to which it is attached, the rear axle of the motor vehicle being attached to the frame member near the rear ends of the frame member; and
a pair of springs, each spring of said pair being positioned between the rear end of one of said frame members and the underside of the rear end of the truck body behind the rear axle, said springs transmitting the weight of the rear end of the vehicle from points behind said axle, through the rear ends of said frame members to said axle;
said truck body being a pickup truck body, and the frame members extending outwardly from their point of attachment to the kick-up portion as well as downwardly from their point of attachment to a lever below a kick-up portion of the side rails, the assembly further comprising a pair of spring holders, one of said spring holders being rigidly attached to each of said side rails at a point laterally outside of the side rail and directly under the rear end of the pickup truck body, each of said springs having a lower end mounted to one of said frame members at the rear end thereof and an upper end received in one of said spring holders.

3. The assembly of claim 2 in which each of the frame members, at its pivot point, is shaped to fit over the sides of the side rail to which it is pivotally attached, the assembly further comprising a pivot pin extending laterally through the side rail and frame member at each of the pivot points, a low friction surface bearing means located between each side of each of the side rails and the rail side facing surfaces of the frame member fitting thereover and extending around the pin to maintain low friction alignment between said frame members and side rails during pivoting.

4. The assembly of claim 3 in which a bushing is positioned over the pin, and said bearing means are spacer elements.

* * * * *